United States Patent
Putscher

[15] 3,705,538
[45] Dec. 12, 1972

[54] PHOTOGRAPHIC APPARATUS FOR USE WITH IMPELLER-ACTUATED SOURCES OF ARTIFICIAL LIGHT

[72] Inventor: Johann Putscher, Munich, Germany

[73] Assignee: Agfa-Gevaert Aktiengesellschaft, Leverkusen, Germany

[22] Filed: May 26, 1971

[21] Appl. No.: 146,965

[30] Foreign Application Priority Data

May 29, 1970 Germany..................P 20 26 341.6

[52] U.S. Cl. .................95/11.5 R, 95/11 L, 240/1.3
[51] Int. Cl. ........................G03b 15/04, G03b 15/03
[58] Field of Search .....95/11.5 R, 11 L, 11; 240/1.3; 431/92, 93

[56] References Cited

UNITED STATES PATENTS 3,602,618  8/1971  Michateck..............................431/93
3,576,155  4/1971  Beach....................................240/1.3

Primary Examiner—Robert P. Greiner
Attorney—Michael S. Striker

[57] ABSTRACT

A still camera with an indexible socket for flashcubes of the type having cartridges which must be struck in order to fire the respective lamps. The cartridge for that lamp which faces the subject can be struck by the pin of an elastic impeller which is mounted in the housing and tends to maintain its pin in a retracted position. The base of the properly inserted flashcube depresses a shaft to stress an L-shaped leaf spring which is coupled to the shaft and to the impeller. A release element is movable with reference to the camera body to engage the impeller and to thereby move the spring from a first stable position through and beyond a neutral position so that the spring snaps over to assume a second stable position and to thereby propel the pin against the cartridge. The shaft can adjust the shutter in response to insertion of the base into the socket to select an exposure time which is best suited for the making of exposures with artificial illumination of the subject.

9 Claims, 4 Drawing Figures

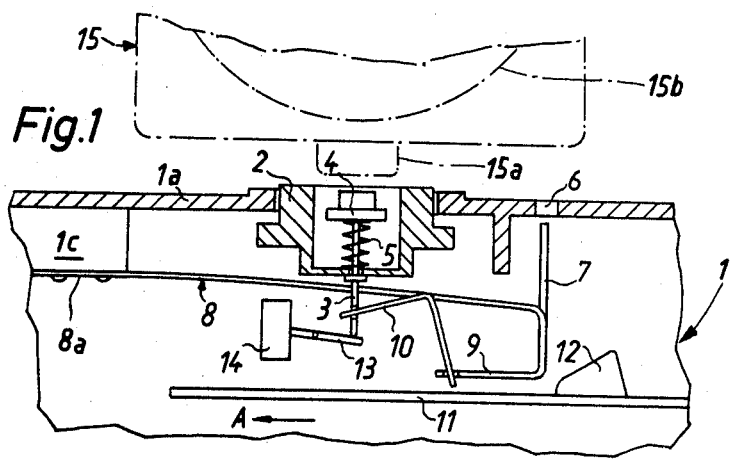
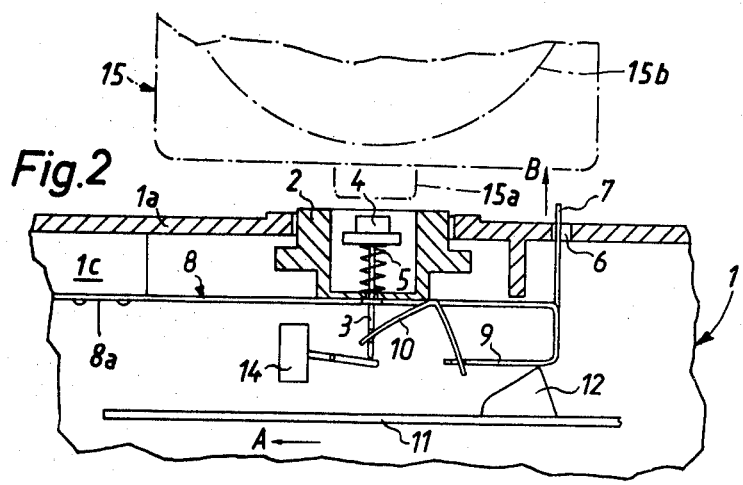

3,705,538

PHOTOGRAPHIC APPARATUS FOR USE WITH IMPELLER-ACTUATED SOURCES OF ARTIFICIAL LIGHT

BACKGROUND OF THE INVENTION

The present invention relates to photographic apparatus in general, and more particularly to improvements in photographic apparatus which can be used with flashcubes, electronic flash units or analogous sources of artificial light wherein a cartridge or a piezoelectric block must be struck to effect the firing of a lamp or of the flash unit. Still more particularly, the invention relates to improvements in means for striking a cartridge, a piezoelectric block or an analogous impact receiving portion of a source of artificial light in order to effect the illumination of a subject or scene.

SUMMARY OF THE INVENTION

An object of the invention is to provide a photographic apparatus for use with flashcubes, electronic flash units or other sources of artificial light which must receive an impact in order to illuminate a subject or scene with simple, compact, rugged, readily adjustable and relatively inexpensive means for producing impacts in automatic response to normal manipulation of the apparatus so the subject or scene is illuminated at the proper time, namely, when the shutter is open.

Another object of the invention is to provide a photographic apparatus, particularly a still camera, with a novel impeller system for the actuation of a source of artificial light in response to transmission of an impact against a cartridge, a piezoelectric element or the like.

A further object of the invention is to provide a photographic apparatus with a reliable impeller system which need not be adjusted or otherwise manipulated by the operator when the apparatus is to be used with or without a source of artificial light.

An additional object of the invention is to provide a photographic apparatus with an impeller system which can automatically adjust the shutter to furnish an appropriate exposure time when the apparatus is to be used with a flashcube, and electronic flash unit or another impact-responsive source of artificial light.

The invention is embodied in a photographic apparatus which comprises a housing or body, a source of artificial light (such as a flashcube or an electronic flash unit) which is preferably detachably and/or movably supported by the housing and has at least one impact-receiving portion which is arranged to effect artificial illumination of a subject by the source in response to reception of an impact (such impact-receiving portion can constitute a cartridge which can be struck to fire a lamp in a flashcube or a piezoelectric block which can be struck to produce a high-voltage pulse for the firing of an electronic flash unit), a stressing portion provided on or connected with the source and movable to and from an operative position (such stressing portion can constitute the base of a flashcube and assumes its operative position when it is properly inserted into a socket provided therefor on the housing of the camera and serving to index the flashcube through 90° or through a whole multiple of 90°), an impeller provided in the housing and having an actuating portion which is movable from a first to a second position to thereby strike against the impact-receiving portion of a source whose stressing portion is held in the operative position, biasing means (such as one or more leaf springs) movable from a first stable position through a neutral position and to a second stable position to thereby propel the actuating portion of the impeller to the second position, tensioning means movable from an idle position to an operative position in response to movement of the stressing portion to its operative position to thereby stress the biasing means so that the latter stores energy which is needed to propel the actuating portion to its second position with a force which suffices to fire a lamp or an electronic flash unit in response to impact of the actuating portion against a cartridge or a piezoelectric block, and release means actuatable to move the biasing means from the first stable position to and beyond the neutral position so that the biasing means automatically advances to its second stable position and propels the actuating portion against the impact-receiving portion in the operative position of the stressing portion. The release means can serve to actuate the shutter so that the latter opens when the source produces artificial light. The aforementioned tensioning means may serve to adjust the shutter in its operative position so that the shutter furnishes an exposure time which is best suited for the making of exposures with the selected light source.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary schematic vertical sectional view of a still camera which embodies the invention, the source of artificial light being shown in detached position so that the stressing means of such source is not located in its operative position;

FIG. 2 illustrates the structure of FIG. 1 but with the release means shown in the process of actuating the shutter and with the actuating portion of the impeller shown in or close to its second position;

DESCRIPTION OF THE PREFERRED EMBODIMENTS

Figure 3:
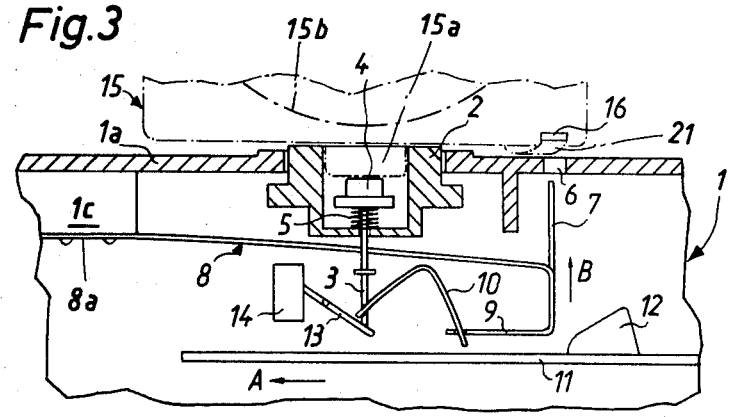
FIG. 3 illustrates the structure of FIG. 1 or 2 but with the source properly attached to the housing so that the stressing portion assumes its operative position and causes the tensioning means to stress the biasing means.
Figure 4:
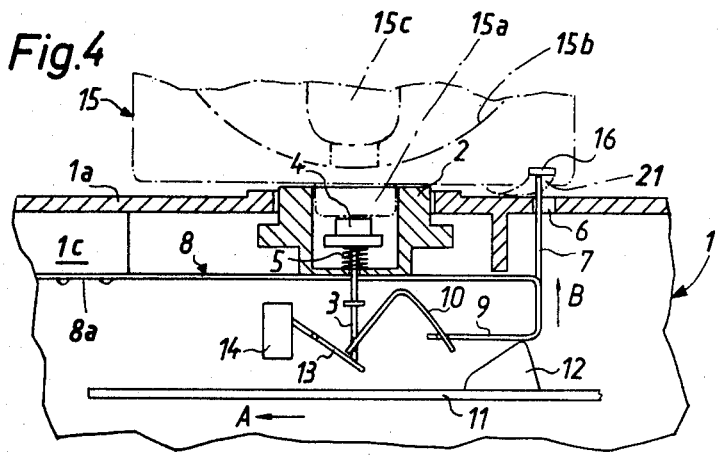
FIG. 4 illustrates the structure of FIG. 3 but with the actuating portion in its second position in which it strikes against an impact receiving portion of the source.

The drawing illustrates a portion of the housing or body 1 of a still camera; the housing 1 has a top wall 1a provided with a cupped socket 2 which is indexible about its axis and serves to receive the base or stressing portion 15a of a source 15 of artificial light here shown as a flashcube with four lamps 15c (see FIG. 4) each located in front of a reflector 15b. The bottom wall of the socket 2 is traversed by a centrally located tensioning shaft 3 which is movable axially up and down, as viewed in FIGS. 1 to 4, between an idle position (FIGS. 1-2) and an operative position (FIGS. 3-4). The reference character 4 denotes an enlarged portion or head provided at the upper end of the tensioning shaft 3 and serving as an abutment for one end convolution of a biasing means here shown as a helical spring 5 which reacts against the bottom wall of the socket 2. The head 4 is engaged and depressed by the stressing portion or base 15a of a flashcube 15 when the latter is properly coupled with the socket 2 whereby the spring 5 stores energy and maintains the shaft in the operative position (see FIGS. 3-4). The operative position of the base 15a is also shown in FIGS. 3-4.

The top wall 1a of the housing 1 is further provided with an opening 6 which is adjacent to the socket 2 and serves to permit passage of an actuating pin 7 forming part of an impeller 8 which is installed in the interior of the housing 1. The impeller 8 is at least partly elastic and its end portion 8a is fixedly secured to the top wall 1a of the housing 1, as at 1c. That end portion of the impeller 8 which is provided with the actuating pin 7 is further provided with a downwardly extending substantially L-shaped motion receiving arm 9. The lower or inner end portion of the tensioning shaft 3 has a slot for one end of a biasing device here shown as an L-shaped leaf spring 10. The other end of the spring 10 extends through a slot in the free end of the arm 9.

A release member 11 is reciprocable in substantial parallelism with the top wall 1a at a level below the arm 9 of the impeller 8. This release member has a projection or lobe 12 which can engage the arm 9 when the release member is actuated to advance in the direction indicated by the arrow A. The release member 11 can actuate a shutter having an adjustable retard mechanism 14.

The lower or inner end portion of the tensioning shaft 3 can engage and displace an adjusting lever 13 which can adjust the retard mechanism 14. When the stressing portion or base 15a is inserted into the socket 2 to assume its operative position (FIGS. 3-4) and to thereby depress the shaft 3 through the intermediary of the head 4, the shaft 3 adjusts the retard mechanism 14 by way of the lever 13 so as to select an exposure time (e.g., one-thirtieth second) which is best suited for the making of exposures with artificial illumination of the subject.

The flashcube 15 is of the type which comprises an impact-receiving cartridge 16 (see FIGS. 3-4) for each of its four lamps 15c. Each cartridge 16 can fire the respective lamp 15c in response to reception of an impact from the actuating pin 7 of the impeller 8. The arrangement is such that the actuating pin 7 can strike against that cartridge 16 which is associated with the lamp 15c that faces the subject. The cartridge 16 for the lamp 15c which faces the subject registers with the opening 6 (see FIGS. 3 and 4).

The operation:

FIGS. 1 and 2 illustrate the flashcube 15 in detached position. The spring 10 is in unstressed condition and that end portion of the spring 10 which is coupled to the arm 9 of the impeller 8 is located at a level below the other end portion which is coupled to the inner end portion of the tensioning shaft 3. The release member 11 can be actuated to move in the direction indicated by arrow A in response to depression of a knob (not shown) or in another suitable way. During forward movement of the release member 11 (arrow A), its projection 12 slides along the arm 9 and causes the actuating pin 7 to move in the direction indicated by the arrow B, i.e., upwardly through and beyond the opening 6 in the top wall 1a. Such movement of the actuating arm 7 from the first position of FIG. 1 toward a second position results in some stressing of the leaf spring 10. However, the point of connection of one end portion of the spring 10 with the arm 9 remains at a level below the other end portion of the spring 10 (namely, of that end portion which is coupled to the inner end portion of the tensioning shaft 3). Thus, the spring 10 does not reach its neutral or dead-center position. When the projection 12 of the release member 11 is disengaged from the arm 9, the impeller 8 is free to return its actuating pin 7 to the first position of FIG. 1. Thus, the interval during which the upper end portion of the pin 7 extends upwardly and beyond the opening 6 in the top wall 1a of the housing 1 is relatively short. The elasticity of the impeller 8 suffices to return the actuating pin to the first position of FIG. 1 in unstressed condition of the leaf spring 10 as soon as the projection 12 of the release member 11 is disengaged from the arm 9.

If the flashcube 15 is properly coupled to the housing 1 so that the stressing portion or base 15a assumes its operative position in which it extends into the socket 2 and an unfired lamp 15c faces the subject, the corresponding cartridge 16 is located directly above the opening 6 and the tensioning shaft 3 is depressed to assume the operative position shown in FIG. 3. Such downward movement of the tensioning shaft 3 results in stressing of the leaf spring 10 and the left-hand end portion of the spring 10 (as viewed in FIG. 3) is then located at a level only slightly above the level of the right-hand end portion (which is coupled to the arm 9). If the tensioning member 11 is thereupon actuated to advance in the direction indicated by the arrow A (see FIG. 4), its projection 12 engages the arm 9 and raises the pin-and-slot connection between the right-hand end portion of the leaf spring 10 to the level of the other end portion, i.e., the spring 10 is moved to and beyond the neutral or dead-center position so that it snaps over and rapidly propels the actuating pin 7 against the adjacent cartridge 16 to fire the lamp 15c which faces the subject. The tensioning shaft 3 cannot rise toward the idle position of FIGS. 1 and 2 because it is held in the operative position by the stressing portion or base 15a of the flashcube 15. As mentioned before, the retard mechanism 14 of the shutter automatically selects an appropriate exposure time when the flashcube 15 is properly attached to the socket 2 because the inner end portion of the depressed tensioning shaft 3 causes the lever 13 to properly adjust the mechanism 14.

Each of the cartridges 16 is adjacent to a suitably inclined cam face 21 of the flashcube 15. Thus, when the flashcube 15 is thereupon indexed through 90° or through a whole multiple of 90°, the oncoming cam face 21 depresses the actuating pin 7 counter to the direction indicated by the arrow B so that the spring 10 is returned to and beyond the neutral or dead-center position and snaps over in the opposite direction to reassume the first stable position shown in FIG. 3. Consequently, the actuating pin 7 is withdrawn into the housing 1 from the second position of FIG. 4 to the first position of FIG. 3 and the camera is ready to make the next exposure with artificial illumination of the subject.

When the flashcube 15 is detached after firing of the last lamp 15c, the spring 5 returns the tensioning shaft 3 to its idle position (FIGS. 1 and 2). The coupling between the shaft 3 and the leaf spring 10 moves to a level well above the coupling between the spring 10 and the arm 9 so that the leaf spring 10 reassumes the normal first stable position of FIG. 1. The spring 5 is stronger than the leaf spring 10; therefore, the socket 2 or the top wall 1a is preferably provided with suitable detent means (not shown) which yieldably holds the stressing portion or base 15a of a properly attached flashcube in the socket 2 with a force that suffices to resist the bias of the spring 5. It is also possible to select the dimensions of the base 15a in such a way that it is held in the socket 2 with a friction which is sufficient to resist the bias of the spring 5 when the latter is held in the compressed condition shown in FIGS. 3 and 4.

The photographic apparatus of the present invention is susceptible of many additional modifications. For example, the biasing means which propels the actuating pin 7 of the impeller 8 to its second or extended position can comprise two or more leaf springs or one or more compression springs. It is desirable to construct and mount the biasing means for the actuating pin 7 in such a way that it can be held in the first stable position (see the position of the leaf spring 10 in FIGS. 1 and 3) without resorting to any special holding means. The feature that the biasing means for the actuating pin is properly stressed only in response to insertion of the stressing portion or base 15a into the socket 2 insures that the actuating pin 7 is moved to its extended or second position (FIG. 2) with minimal acceleration when the stressing portion of base 15a is moved away from the operative position of FIGS. 3 and 4.

Another important advantage of the illustrated apparatus is that, in response to movement of the stressing portion or base 15a to the operative position of FIGS. 3 and 4, the point of connection between the left-hand leg of the leaf spring 10 and the tensioning shaft 3 is shifted with reference to the point of connection between the right-hand leg of the spring 10 and the arm 9 of the impeller 8 in such a way that the leaf spring 10 can automatically reassume its first stable position (FIGS. 1 and 3) when the actuation of release member 11 is terminated. When the stressing portion or base 15a of the flashcube 15 is withdrawn from the socket 2, the point of connection between the left-hand leg of the leaf spring 10 and the tensioning shaft 3 is moved by the spring 5 with reference to the point of connection between the right-hand leg of the spring 10 and the arm 9 in such a way that the spring 10 cannot reach its neutral position in response to actuation of the release member 11, i.e., in response to movement of the member 11 in the direction indicated by the arrow A. Therefore, the actuating pin 7 is merely pushed to its extended or second position in response to engagement between the lobe 12 and the arm 9 because the leaf spring 10 is not stressed and is held in such position (see FIGS. 1 and 2) that it never reaches the neutral or dead-center position even if the release member 11 is moved all the way to the left so that it can actuate the shutter in order to make an exposure in daylight or with artificial light which is furnished by a source other than the flashcube 15. This insures that the leaf spring 10 returns to its first stable position (FIG. 1) and that the actuating pin 7 returns to its first or retracted position (FIG. 1) in automatic response to completed actuation of the release member 11. As shown in FIGS. 1 to 3, the point of connection between the let-hand leg of the leaf spring 10 and the shaft 3 is located ahead of (above) the point of connection between the right-hand leg of the spring 10 and the arm 9, as considered in the direction (arrow B) of movement of the actuating pin from its first or retracted to its second or extended position, when the spring 10 is held in its first stable position or when the spring 10 is not permitted to reach its neutral position.

As mentioned before, the L-shaped leaf spring 10 can be replaced by biasing means in the form of one or more compression springs and by suitable guide means for controlling lengthwise movements of such compression spring. Furthermore, the biasing means for the impeller may comprise a lever which is pivotable in the housing about a fixed axis and a spring which engages the lever at a first point close to its free end and engages with the impeller at a second point whereby the two points are located ahead of the fixed axis, as considered in the direction of movement of the actuating portion of the impeller from its first to its second position.

Still further, the impeller may comprise a pivotable arm which is turnable about an axis located behind the two ends of the biasing means, as considered in the direction of movement of the actuating portion to its second position.

The photographic apparatus can be further provided with a spring or with other suitable biasing means which permanently urges the actuating pin 7 to its first or retracted position and whose bias must be overcome by the leaf spring 10 or by other suitable biasing means for the impeller when such biasing means for the impeller is stressed by the tensioning shaft 3 in response to insertion of the stressing portion or base 15a into the socket 2 and in response to movement of the biasing means for the impeller from its first stable position toward and at least slightly beyond the neutral position so that the biasing means can snap over to assume its other or second stable position. The spring which serves to urge the actuating pin 7 to its first position can be omitted in the embodiment of FIGS. 1–4 because the illustrated impeller comprises an elastic portion (for example, the portion which extends between the arm 9 and the securing means 1b) which is springy enough to normally maintain the actuating pin 7 in the retracted or first position of FIGS. 1 and 3. The force which is exerted by the aforementioned spring for the actuating portion 7 or by the elastic portion of the impeller 8 is weaker than the force which is applied to the impeller by the spring 10 or by analogous biasing means when such biasing means is in stressed condition and is caused to move from its first stable position to and beyond the neutral position. This insures that the actuating pin 7 is propelled against a cartridge 16 or against a piezoelectric block with a force which insures the firing of a lamp or the firing of an electronic flash unit.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended:

1. In a photographic apparatus, the combination of a housing; a source of artificial light having at least one impact receiving portion arranged to effect artificial illumination of a subject by said source in response to reception of an impact and a stressing portion movable with reference to said housing to and from an operative position; an impeller mounted in said housing and having an actuating portion movable from a first to a second position to thereby strike against said impact receiving portion in the operative position of said stressing portion; biasing means movable from a first stable position through a neutral position to a second stable position to thereby propel said actuating portion to said second position; tensioning means movable from an idle position to an operative position in response to movement of said stressing portion to said operative position to thereby stress said biasing means; and release means actuatable to move said biasing means from said first stable position to and beyond said neutral position whereby said biasing means automatically advances toward said second stable position to propel said actuating portion to said second position.

2. The combination as defined in claim 1, wherein said source comprises a flashcube having at least one lamp and said impact receiving portion includes a cartridge which fires said lamp in response to reception of an impact from said actuating portion.

3. The combination as defined in claim 1, wherein said biasing means is arranged to reassume said first stable position upon completed actuation of said release means at least when said stressing portion is out of said operative position thereof.

4. The combination as defined in claim 3, wherein said biasing means comprises a first portion which is coupled with said tensioning means and a second portion which is coupled with said impeller, said first portion being shifted by said tensioning means with reference to said second portion in response to movement of said stressing portion from the operative position thereof so that said biasing means does not reach said neutral position in response to actuation of said release means.

5. The combination as defined in claim 1, wherein said biasing means comprises a leaf spring having two mutually inclined portions one of which is coupled to said tensioning means at a first point and the other of which is coupled to said impeller at a second point located behind said first point in the first stable position of said biasing means, as considered in the direction of movement of said actuating portion from the first to the second position thereof.

6. The combination as defined in claim 1, wherein said impeller consists at least in part of elastomeric material, and further comprising means for securing said impeller to said housing.

7. The combination as defined in claim 1, wherein said tensioning means comprises a shaft which is reciprocable between said idle and operative positions thereof.

8. The combination as defined in claim 1, further comprising adjustable exposure time selecting means provided in said housing and means for adjusting said selecting means to furnish a predetermined exposure time in response to movement of said tensioning means to the operative position thereof.

9. The combination as defined in claim 1, wherein said impeller further comprises an elastic portion which biases said actuating portion to said first position with a force which is weaker than the force of said biasing means in the stressed condition thereof.

* * * * *